Patented June 12, 1951

2,556,651

UNITED STATES PATENT OFFICE 2,556,651

SHORTSTOPPING AGENT FOR EMULSION POLYMERIZATIONS

Louis H. Howland, Watertown, and James A. Reynolds, Naugatuck, Conn., assignors to United States Rubber Company, New York, N. Y., a corporation of New Jersey No Drawing. Application March 9, 1949, Serial No. 80,566

9 Claims. (Cl. 260—83.7)

This invention relates to the use of a new shortstopping agent in the preparation of synthetic resin latices.

It is known to produce synthetic resins (including so-called elastomeric synthetic resins or synthetic-rubbers) by the aqueous emulsion polymerization of unsaturated monomers, such as monoolefines containing a terminal methylene group, and conjugated diolefines, and mixtures thereof, in the presence of an oxidizing catalyst, and, if desired, a so-called polymerization regulator, such as an alkyl mercaptan having 6 to 18 carbon atoms, or an aromatic mercaptan. In practice, the emulsion polymerization is not allowed to go to completion because of the excessive time necessary for complete conversion of the polymerizable monomers and because of the undesirable properties that may be imparted to the synthetic resin where the polymerization has been permitted to go to completion. The polymerization is usually permitted to go to around 60 to 95% of completion as determined by consumption of original polymerizable monomers. The unreacted polymerizable monomers are removed from the resin latex as by venting off monomers which are gaseous at atmospheric pressure, and steam or vacuum distilling, residual higher boiling point or liquid monomers, and the thus recovered polymerizable monomers are utilized in subsequent emulsion polymerizations. Before removing unreacted monomers from the synthetic resin latex, particularly any liquid monomers, there is added to the latex a so-called shortstopping agent which prevents further polymerization of the monomers during the removal operation. The polymerization of residual monomers during the monomer-removing or so-called stripping operation imparts undesirable physical properties to the final synthetic resin. Various materials such as hydroquinone and sodium sulfide have been used as shortstopping agents or inhibitors of further polymerization, but they have various disadvantages. Hydroquinone which is effective in inhibiting further polymerization when it is desired to remove unreacted monomers, badly discolors the resulting synthetic resin which is a disadvantage in the production of light-colored products. Sodium sulfide is corrosive to the manufacturing equipment, such as the metal reactors. Phenyl ethanol amine has been suggested as a non-discoloring and non-corrosive shortstopping agent, but it has the serious disadvantage of contaminating the unpolymerized polymerizable monomers that are recovered from the synthetic resin latex as by steam distillation so that the thus recovered residual polymerizable monomers retard the subsequent polymerizations in which they may be used.

We have discovered that phenyl diethanol amine and beta-naphthyl diethanol amine do not have the disadvantages of the above referred prior shortstopping agents. The phenyl diethanol amine and beta-naphthyl diethanol amine are non-discoloring, non-corrosive, and do not contaminate recovered residual monomers.

The amount of phenyl diethanol amine or beta-naphthyl diethanol amine to stop the polymerization reaction is not critical, generally 0.05 to 0.5 part by weight of polymerizable material originally present in the emulsion will be used, although smaller or larger amounts may be employed. The phenyl diethanol amine or beta-naphthyl diethanol amine may be added to the aqueous emulsion polymerizate after any desired degree of conversion. Generally this will be after conversion of 60 to 95% of polymerizable monomers originally present to synthetic rubber depending on the particular monomers and the physical properties desired in the final synthetic resin product. The phenyl diethanol amine or beta-naphthyl diethanol amine is preferably added to the synthetic resin latex to stop further polymerization before removal of any unreacted monomers. However, if the synthetic resin latex is prepared from mixtures of low boiling monomers, such as butadiene, and high boiling monoers, such as styrene or acrylonitrile, the butadiene may be vented from the reactor by reducing the pressure to atmospheric pressure before addition of the phenyl diethanol amine or beta-naphthyl diethanol amine, after which addition the higher boiling monomers, such as styrene and acrylonitrile, may be recovered by conventional steam distillation. The recovered unreacted monomers may be reused in subsequent resin latex preparations without retarding the polymerization, the phenyl diethanol amine or beta-naphthyl diethanol amine not being removed with the unreacted polymerizable monomers so that it does not contaminate the same.

The polymerizable material for the preparation of the synthetic resin latex may be monoolefines or conjugated diolefines or mixtures of the same. The monoolefines may be one or more monoethylenic compounds containing a terminal methylene ($CH_2=C<$) group in which at least one of the disconnected valences is attached to an electronegative group, that is, a group which substantially increases the electrical dissymmetry or polar character of the molecule, e. g. aryl olefines such as styrene, vinyl naphthylene, alpha-methyl styrene, para-chlorostyrene, dichlorostyrenes; the alpha methylene carboxylic acids and their esters, nitriles and amides, such as acrylic acid, methyl acrylate, methyl methacrylate, acrylonitrile, methacrylonitrile, methacrylamide; vinyl esters of alkanoic acids, such as vinyl formate vinyl acetate, vinyl butyrate. The conjugated diolefines may be one or more butadienes-1,3, e. g. butadiene-1,3, 2-methyl butadiene-1,3, 2-chloro butadiene-1,3, 2,3-dimethyl butadiene-1,3, piperylene. The polymerizable material may be mixtures of one or more such monoolefines with one or more such conjugated diolefines, for example, the aqueous emulsion polymerization of one or more butadienes-1,3, or mixtures of one or more butadienes-1,3 with up to 70% by weight of such mixture of one or more such monoolefines containing a terminal methylene group will give the so-called synthetic rubber latices. The polymerization of one or more such monoolefines containing a terminal methylene group, or mixtures of one or more such monoolefines with less than 30% by weight of such mixture of one or more butadienes-1,3, will give synthetic resin latices of the more plastic rather than elastic resins, as known.

The oxidizing catalysts used in the preparation of such synthetic resin latices are the conventional peroxygen type catalysts, such as persalts, e. g. alkali persulfates, alkali perborates, alkali percarbonates, hydrogen peroxide; or organic peroxides, e. g. acyl peroxides, such as diacetyl peroxide, dibenzoyl peroxide, acetyl benzoyl peroxide, and alkyl peroxides, such as tertiary-butyl hydroperoxide. The persalts and hydrogen peroxide are the preferred catalysts for polymerization in aqueous emulsions, as in the present case.

The following examples are given in illustration of the invention, the parts referred to therein being by weight:

*Example I*

71 parts of butadiene-1,3 and 29 parts of styrene having dissolved therein .4 part of dodecyl mercaptan, a conventional regulator, were emulsified in a solution of 5 parts of ordinary soap (sodium soap of mixture of oleic, stearic and palmitic acids), and .3 part potassium persulfate, as catalyst, and 180 parts of water. A number of replicates of the above emulsion were prepared and these were gently agitated and heated for 15 hours at 45° C. in closed vessels to copolymerize the butadiene and styrene. At the end of this time various amounts of phenyl diethanol amine, and beta-naphthyl diethanol amine and hydroquinone were added to the various emulsions, after which the polymerization was continued at 45° C. for an additional 24 hours. Following this, the vessels were opened, the unreacted butadiene vented off, and the unreacted styrene was removed by steam distillation. The various latices were then flocculated with salt and sulfuric acid in the conventional manner to recover the solid synthetic rubber which was filtered, washed and dried in air at 58° C. for 15 to 18 hours. The weight of the recovered synthetic rubber gives the final conversion. The plasticities of the products were measured on the Mooney shearing disc plastometer (as described by Mooney in "Industrial and Engineering Chemistry" (analytical edition), vol. 6, 1934, page 147). The results are given as Mooney viscosities on an arbitrary scale. It is noted that the higher the Mooney viscosity the greater power necessary for break-down of the synthetic rubber, and the greater cross linking of the rubber. The average conversion of monomers to synthetic rubber in the portions shortstopped with .1 part of hydroquinone after 15 hours and with heating continued for 24 hours was 78%, and the average Mooney viscosity of the recovered products was 49. These are approximately the same values that are obtained in the conventional shortstopping of the butadiene-styrene polymerization after 15 hours at 45° C., and then recovering the synthetic rubber without the additional 24 hour polymerization which was included above for comparison reasons, the hydroquinone being known to absolutely shortstop the reaction. Where phenyl diethanol amine was used as a shortstop in concentrations of .05%, .10% and .12%, based on the original polymerizable butadiene and styrene monomers, the final conversions after the 24 hour heating subsequent to the phenyl diethanol amine additions were 77%, 79%, and 81%, respectively, and the Mooney viscosities were 47, 53 and 50, respectively. Where .10% beta-naphthyl diethanolamine was used per 100 parts of original butadiene and styrene monomers and the polymerization continued for 24 hours after the beta-naphthyl diethanol amine addition, the conversion of monomers to polymer was 74%, and the Mooney viscosity of the product was 47. These figures show that the phenyl diethanol amine and beta-naphthyl diethanol amine completely shortstopped the polymerization when added at the end of 15 hours heating at 45° C., and that no further conversion or cross linking took place.

*Example II*

The following shows that phenyl diethanol amine does not contaminate the unreacted monomeric styrene recovered by steam distillation any more than in the case of hydroquinone, which is the standard shortstop in the GR-S program where re-using the recovered monomeric styrene is conventional practice. Duplicate emulsions were prepared similarly to Example I with 71 parts of butadiene-1,3, 29 parts of styrene, 180 parts of water, 4.3 parts of soap, 0.01 part of sodium hydroxide, 0.5 part of dodecyl mercaptan and 0.23 part of potassium persulfate. Fresh butadiene and fresh styrene were used in the first of these runs and the polymerization was made to take place by agitating at 50° C. until 72% conversion of monomers to copolymer. The average time for 72% conversion was 9 hours. After the 72% conversion 0.12 part of phenyl diethanol amine was added to one of the batches and 0.08 part of hydroquinone was added to the other batch. The butadiene was vented off and the styrene steam distilled from the two batches and separately recovered. The recovered styrenes were used in making up two new batches according to the original formulation. These batches containing the recovered styrenes, one from the latex shortstopped with phenyl diethanol amine, and the other from the latex shortstopped with hydroquinone, were polymerized at 50° C. until 72% conversion. The time for 72% conversion of the emulsion containing the styrene recovered from the phenyl diethanol amine shortstopped latex, was 10¼ hours, whereas the time for 72% conversion of the emulsion containing the styrene from the hydroquinone shortstopped latex, was 10 hours. After the 72% conversion of these second latex batches, the latices were shortstopped with 0.12 part of phenyl diethanol amine and 0.08 part of hydroquinone, respectively, similarly to the first latex, after which the butadiene was vented off and the styrene steam distilled and separately recovered. The thus recovered styrenes were used in the third polymerization similar to the two previous polymerizations as described above. The emulsions of butadiene and styrene were again heated at 50° C. until 72% conversion. In the case of the emulsion containing the styrene from the phenyl diethanol amine shortstopped latex, the time for 72% conversion was 12 hours, and the time for 72% conversion of the emulsion containing the styrene from the hydroquinone shortstopped latex was also 12 hours. That there is a slow-down in subsequent polymerizations is true due to the impurities which the styrene contains, but this is not due to contamination from phenyl diethanol amine any more than from hydroquinone.

*Example III*

This example compares the results of shortstopping with phenyl diethanol amine and phenyl ethanol amine. In this case duplicate emulsions were made up according to the formulation used in Example I. The two batches were polymerized at 45° C. for 15 hours, after which one was shortstopped with 0.10 part of phenyl diethanol amine and the second with 0.10 part of phenyl ethanol amine. The butadiene was vented from the latex and the styrene steam distilled and separately recovered. The recovered styrenes were used in second polymerizations of the same formulation as the first polymerization and again at 45° C. for 15 hours. The two latices were then shortstopped with phenyl diethanol amine and phenyl ethanol amine respectively, and again the butadiene was vented off and the styrene recovered by steam distillation. The recovered styrenes were used in third polymerizations of the same formulation as the first polymerization and again at 45° C. for 15 hours, after which the butadiene was vented and the styrene removed by steam distillation. The average conversion in the first polymerizations with fresh butadiene and styrene was 74%. In the second polymerization the recovery in the batch using the styrene recovered from the phenyl diethanol amine shortstopped latex was 72.5%, whereas the conversion in the batch using the styrene recovered from the phenyl ethanol amine shortstopped latex was 64.5%. In the third polymerization the conversion of the batch using the recovered styrene from the second phenyl diethanol amine shortstopped latex was 60.0%, whereas the conversion in the batch using the styrene recovered from the second phenyl ethanol amine shortstopped latex was 54.3%. This shows a retardation of subsequent polymerizations and a definite contamination of the recovered styrene in the case of the phenyl ethanol amine as compared with the phenyl diethanol amine of the present invention.

In view of the many changes and modifications that may be made without departing from the principles underlying the invention, reference should be made to the appended claims for an understanding of the scope of the protection afforded the invention.

Having thus described our invention, what we claim and desire to protect by Letters Patent is:

1. In the preparation of a synthetic rubber latex by the polymerization of an aqueous emulsion of polymerizable monomeric material selected from the group consisting of butadienes-1, 3 and mixtures of butadienes-1, 3 with up to 70% by weight of the mixture of monoolefins containing a terminal methylene group, the step which comprises adding to the emulsion .05 to .5 part by weight of material selected from the group consisting of phenyl diethanol amine and beta-naphthyl diethanol amine per 100 parts by weight of polymerizable material initially present, after conversion of 60 to 95% of the polymerizable material orginally present in the emulsion to synthetic rubber and while the latex contains unreacted polymerizable monomeric material.

2. In the preparation of a synthetic rubber latex by the polymerization of an aqueous emulsion of a mixture of a butadiene-1,3 and up to 70% by weight of the mixture of a monoolefine containing a terminal methylene group, the step which comprises adding to the emulsion .05 to .5 part by weight of material selected from the group consisting of phenyl diethanol amine and beta-naphthyl diethanol amine per 100 parts by weight of polymerizable material initially present, after conversion of 60 to 95% of the polymerizable material originally present in the emulsion to synthetic rubber and while the latex contains unreacted polymerizable monomeric material.

3. In the preparation of a synthetic rubber latex by the polymerization of an aqueous emulsion of a mixture of butadiene-1,3 and styrene, the step which comprises adding to the emulsion .05 to .5 part by weight of phenyl diethanol amine per 100 parts by weight of butadiene-1,3 and styrene initially present, after conversion of 60 to 95% of the butadiene-1,3 and styrene mixture originally present in the emulsion to copolymer and while the latex contains unreacted styrene.

4. In the preparation of a synthetic rubber latex by the polymerization of an aqueous emulsion of a mixture of butadiene-1,3 and styrene, the step which comprises adding to the emulsion .05 to .5 part by weight of beta-naphthyl diethanol amine per 100 parts by weight of butadiene-1,3 and styrene initially present, after conversion of 60 to 95% of the butadiene-1,3 and styrene mixture originally present in the emulsion to copolymer and while the latex contains unreacted styrene.

5. The method of preparing a synthetic rubber latex which comprises polymerizing an aqueous emulsion of polymerizable monomeric material selected from the group consisting of butadienes-1,3 and mixtures of butadienes-1,3 with up to 70% by weight of the mixture of monoolefines containing a terminal methylene group in the presence of an oxidizing catalyst, and after conversion of 60 to 95% by weight of the polymerizable material originally present in the emulsion, adding to the latex thus produced .05 to .5 part by weight of material selected from the group consisting of phenyl diethanol amine and beta-naphthyl diethanol amine per 100 parts by weight of polymerizable material initially present, and thereafter removing residual unreacted monomeric material from the latex.

6. The method of preparing a synthetic rubber latex which comprises polymerizing an aqueous emulsion of polymerizable monomeric material selected from the group consisting of butadienes-1,3 and mixtures of butadienes-1,3 with up to 70% by weight of the mixture of monoolefines containing a terminal methylene group in the presence of an oxidizing catalyst, and after conversion of 60 to 95% by weight of the polymerizable material originally present in the emulsion, adding to the latex thus produced .05 to .5 part by weight of phenyl diethanol amine per 100 parts by weight of polymerizable material initially present, and thereafter removing residual unreacted monomeric material from the latex, and reusing said removed residual unreacted monomeric material in subsequent emulsion polymerization.

7. The method of preparing a synthetic rubber latex which comprises polymerizing an aqueous emulsion of polymerizable monomeric material selected from the group consisting of butadienes-1,3 and mixtures of butadienes-1,3 with up to 70% by weight of the mixture of monoolefines containing a terminal methylene group in the presence of an oxidizing catalyst, and after conversion of 60 to 95% by weight of the polymerizable material originally present in the emulsion, adding to the latex thus produced .05 to .5 part by weight of beta-naphthyl diethanol amine per 100 parts by weight of polymerizable material initially present, and thereafter removing residual unreacted monomeric material from the latex, and reusing said removed residual unreacted monomeric material in subsequent emulsion polymerization.

8. The method of preparing a synthetic rubber latex which comprises polymerizing an aqueous emulsion of a mixture of butadiene-1,3 and styrene in the presence of an oxidizing catalyst, and after conversion of 60 to 95% by weight of the butadiene-1,3 and styrene mixture originally present in the emulsion, adding to the latex thus produced .05 to .5 part by weight of phenyl diethanol amine per 100 parts by weight of butadiene-1,3 and styrene initially present, while said latex contains unreacted styrene, and thereafter removing and recovering unreacted styrene from the latex and reusing it in subsequent emulsion polymerization.

9. The method of preparing a synthetic rubber latex which comprises polymerizing an aqueous emulsion of a mixture of butadiene-1,3 and styrene in the presence of an oxidizing catalyst, and after conversion of 60 to 95% by weight of the butadiene-1,3 and styrene mixture originally present in the emulsion, adding to the latex thus produced .05 to .5 part by weight of beta-naphthyl diethanol amine per 100 parts by weight of butadiene-1,3 and styrene initially present, while said latex contains unreacted styrene, and thereafter removing and recovering unreacted styrene from the latex and reusing it in subsequent emulsion polymerization.

LOUIS H. HOWLAND.
JAMES A. REYNOLDS.

REFERENCES CITED

The following references are of record in the file of this patent:

UNITED STATES PATENTS

| Number | Name | Date |
|---|---|---|
| 2,444,801 | Arundale | July 8, 1948 |